(12) United States Patent
Presby

(10) Patent No.: US 6,290,429 B1
(45) Date of Patent: Sep. 18, 2001

(54) MULTI-LEVEL LEACHING SYSTEM

(76) Inventor: David W. Presby, P.O. Box 617, Sugar Hill, NH (US) 03585

( * ) Notice: Subject to any disclaimer, the term of this patent is extended or adjusted under 35 U.S.C. 154(b) by 0 days.

(21) Appl. No.: 09/420,197

(22) Filed: Oct. 18, 1999

Related U.S. Application Data (60) Provisional application No. 60/104,751, filed on Oct. 19, 1998.

(51) Int. Cl.$^7$ ....................................................... C02F 1/00
(52) U.S. Cl. ................................ 405/45; 405/51; 210/170
(58) Field of Search ................................ 405/36, 43, 45, 405/51, 80; 210/170, 519, 521, 532.2, 921

(56) References Cited

U.S. PATENT DOCUMENTS

| | | | |
|---|---|---|---|
| 5,322,387 | * | 6/1994 | Heine et al. ............................ 405/36 |
| 5,597,264 | * | 1/1997 | Laak ....................................... 405/36 |
| 5,669,733 | * | 9/1997 | Daly et al. ......................... 405/43 X |

OTHER PUBLICATIONS

Viessman, Jr., Warren et al., Water Supply and Pollution Control, Fifth Ed., Harper Collins College Publishers, pp. 504–8, 1993.*

* cited by examiner

Primary Examiner—David Bagnell
Assistant Examiner—Tara L. Mayo
(74) Attorney, Agent, or Firm—George W. Dishong (57) ABSTRACT

The invention most fundamentally is a leaching system substantially consisting of subsystems of liquid permeable conduit, serial or parallel interconnected for the serial or parallel flow of fluid being processed. Fluid flow is within subsystems and between subsystems from one level to another level. I.e., the subsystems of which the system is comprised are located at different depths one above the other within a "leach bed" or within the volume designed to process the leached fluid. The leaching system has at least two (2) leaching subsystems wherein each of the leaching subsystems is planarly located at a different depth within the leaching field having the leaching system installed therein. The leaching subsystems are fluid flow connected, using tubing, such that fluid being leached either flows; (1.) sequentially or serially through one of the subsystems and then sequentially or serially through another of the subsystems and subsequently through yet another subsystem until the last of the subsystems; or (2.) the fluid being leached is divided such that the divided portions flow in a parallel paths or substantially simultaneously through one of the subsystems and then subsequently through the remaining subsystems either simultaneously or sequentially and in either sequential flow or parallel flow within the components of the subsystems. The system permits a greater density of bacteria within a leaching area. The multi-level system allows a straightforward installation of a leaching system in small or irregularly shaped areas where installation of effective single level systems would be difficult or impossible.

21 Claims, 4 Drawing Sheets

MULTI-LEVEL LEACHING SYSTEM

This application claims the benefit of PROVISIONAL application No. 60/104,751, filed Oct. 19, 1998, by David W. Presby entitled MULTI-LEVEL LEACHING SYSTEM.

BACKGROUND OF THE INVENTION

1. Field of the Invention

This invention relates to systems for leaching liquid waste, particularly waste water. More particularly this invention relates to a system of configuring cylindrical conduit used in leaching systems. Even more particularly the invention relates to the use of multiple levels of cylindrical conduit. The material within which the conduit is located may either disperse moisture away from the conduit through capillary action, wicking into the surrounding material or fluid may be extracted from contaminated fluid which is within or a part of a material surrounding the conduit, the extracted fluid being more free of the contaminants which may be in the contaminated fluid. A perforated cylindrical conduit is one method permitting wicking. The surrounding material provides capillary action to transmit moisture away from the cylinder and prevents the effluent from traveling directly from the pipes of the upper level to the conduits of the lower levels. Examples of these materials include sand, gravel, plastic fibers, wood products, slag, and ash. A fabric or other material may surround the cylindrical conduit. The cylindrical conduit may be either smooth walled or corrugated. For septic systems, this includes any graveless systems such as the SB2, ENVIRO-SEPTIC and GEO-FLOW systems. Other applications of this invention include treatment of oil-contaminated water and chemically contaminated water, in addition to septic tank effluent.

The multi-level configuration of the present invention creates a larger leaching surface in a fixed surface area than a single level leaching system. This larger leaching surface area is beneficial for increasing bacterial concentration and installation of systems in small spaces.

2. Description of the Prior Art

Leaching systems typically utilize substantially two-dimensional stone beds or chambers. The multiple layering of leach beds, chambers and conduits has not been feasible up to now. One problem is that liquid from one leach area would return to the system through a lower leach area. Another problem is the difficulty in constructing multiple layers using traditional methods.

SUMMARY OF THE INVENTION

The invention most fundamentally is a leaching system substantially comprised of subsystems of liquid permeable conduit, serial or parallel interconnected for the serial or parallel flow of fluid being processed. Fluid flow is within subsystems and between subsystems from one level to another level. I.e., the subsystems of which the system is comprised are located at different depths one above the other within a "leach bed" or within the volume designed to process the contaminated/leached fluid.

The present invention, is a leaching system having at least two (2) leaching subsystems wherein each of the at least two leaching subsystems is planarly located at a different depth within the leaching field having the leaching system installed therein. The leaching subsystems are fluid flow connected such that fluid being leached either flows; (1.) sequentially or serially through one of the subsystems and then sequentially or serially through another of the subsystems and subsequently through yet another subsystem until the last of the subsystems; or (2.) the fluid being leached is divided such that the divided portions flow in a parallel paths or substantially simultaneously through one of the subsystems and then subsequently through the remaining subsystems either simultaneously or sequentially and in either sequential flow or parallel flow within the components of the subsystems. Each of the leaching subsystems has at least one liquid permeable conduit with means for providing for fluid flow connection at an input end and an output end, fluid flow being into the input end and out through the output end. The means for providing for fluid flow connection provides interconnection of each of the liquid permeable conduits which are members of a subsystem, in either serial or parallel flow configuration and for connection of one of the subsystems to another of the subsystems at a different depth.

The present invention, in its most simple embodiment, is a multi-level leaching system for leaching liquid waste comprising a plurality of leaching subsystems each of which is planarly positioned at a different depth, the leaching subsystems being fluid flow connected such that fluid being leached is caused to flow into and through each of the leaching subsystems. The invention, the multi-level leaching system, leaches waste liquid through at least one liquid permeable conduits, preferably cylindrical conduits, which conduits are members of the subsystems which subsystems are planarly arranged in multiple levels. The number of leaching subsystems and the number of conduits within each subsystem will depend upon the magnitude or the volume of fluid which is to be processed by leaching.

The present invention is composed minimally of two leaching cylinders with each cylinder arranged in two substantially horizontal planes. The uppermost plane contains the first leaching cylinder, which is supplied waste liquid by a source pipe. The lowermost plane contains the final leaching cylinder, which is connected to the first leaching cylinder by a pipe. The first and final leaching cylinders may be horizontally arranged with respect to one another by any angle.

More preferably, the system includes a plurality of leaching conduits/cylinders with the cylinders arranged in two or more substantially horizontal planes, in reference to the axial direction of the leaching cylinders or conduit, thereby forming leaching subsystems. The plane created by orthogonals through the axial center-lines of the leaching conduit need not be substantially horizontal, i.e., the plane formed by the leaching subsystems is substantially horizontal in the direction of the axial center-lines but may be other than horizontal in the direction of the orthogonals to the centerlines. The uppermost leaching subsystem,preferably planarly configured, contains the first leaching cylinder, which is supplied waste by a source pipe, and may contain one or more intermediate cylinders. The lowermost leaching subsystem, again preferably planarly configured, contains the final leaching cylinder, which is connected to the preceding intermediate leaching cylinder, and may also contain one or more intermediate cylinders. The region between the uppermost and lowermost leaching subsystems may contain one or more intermediate cylinders, which are each connected to the preceding leaching cylinder, respectively.

Even more preferably, a liquid dispersing material surrounds the leaching cylinders of the system. The liquid dispersing material may be one or more of the following, including but not limited to, sand, gravel, plastic fibers, wood products, slag, and ash. The material surrounds the cylinders a given distance. The distance for a 12-inch cylinder is about 6 inches. Other distances are acceptable when capillary action disperses the liquid away from the leaching cylinder and not back into the system.

One advantage of the present invention is the multi-level system is greater leaching volume in a fixed surface area than a single level system. The additional leaching levels of system allow more leaching surface area to be utilized than a single level system.

Another advantage of the present invention is the present invention may be used to treat a variety of liquid waste including, but not limited to, septic tank effluent, strong waste water having high BOD and suspended solids concentrations, oil contaminated water, and chemically contaminated water. The contaminated fluid may pass through the liquid permeable conduit from within to without the conduit or it may be drawn from outside the conduit to within the conduit as a processed fluid more free of the contaminants.

Yet, another advantage of the present invention is that any type of cylindrical conduit may be used with the multi-level leaching system. For septic purposes, this includes any graveless system such as the SB2, ENVIRO-SEPTIC, and GEO-FLOW brands of leaching conduit.

Still yet, another advantage of the present invention is high bacterial concentration. This concentration of bacteria in a small surface area permits installation of multi-level leaching systems in small spaces.

These and further objects of the present invention will become apparent to those skilled in the art after a study of the present disclosure of the invention.

DESCRIPTION OF THE PREFERRED EMBODIMENTS

The system 10 seen in FIGS. 1–4 has a first leaching cylinder 12. The first leaching cylinder 12 is composed of first and second end walls 14, 16 connected by a liquid permeable lateral wall 18. The first and second end walls 14, 16 contain inlet and outlet adapters 20, 22, respectively. Inlet adapter 20 is configured to receive liquid waste from a liquid waste source pipe 24. First leaching cylinder 12 is positioned in a relatively horizontal position with respect to the lateral wall 18, and at a horizontal angle with respect to the liquid waste source pipe 24. First leaching cylinder 12 defines a horizontal uppermost plane 28 of system 10. Final leaching cylinder 12 has a center-line forming an uppermost to lowermost cylinder angle Ω of between 0° and 90° with the first leaching cylinder center-line. Similarly, where cylinders 12 and intermediate cylinder 38 of the uppermost subsystem 10A (see FIGS. 5 and 6) form an uppermost plane 11A, the orientation of cylinders 30 and intermediate cylinders 38 forming the lowermost plane, the cylinder center-lines may form any angle Ω which is appropriate for the terrain and the leaching requirements. It should be clearly noted that while the drawing figures depict cylinders having center-lines which are substantially parallel each to the other in one subsystem 10A and those in the other subsystem 10B, such is not required. There may be engineering reasons for non-parallel orientations between the cylinders of the same subsystem. The invention of system 10 is substantially comprised of subsystems of liquid permeable conduit, serial or parallel interconnected for the serial or parallel flow of fluid being processed from one level to another level, i.e., which subsystems are located at different depths one above the other within leach bed 8.

System 10 further has a final leaching cylinder 30. The final leaching cylinder is composed of first end wall 14 and an end cap 32 connected by a liquid permeable lateral wall 18. The final leaching cylinder is positioned in a relatively horizontal position with respect to the lateral wall 18, and at a horizontal angle b with respect to the liquid the first leaching cylinder 12. The final leaching cylinder 30 defines a horizontal lowermost plane 28 of the system 10. The lowermost plane 28 is a first given distance above the water table or restrictive layer, and is a second given distance below the uppermost plane 34. The first end wall 14 contains an inlet adapter 20. Inlet adapter 20 is configured to receive liquid waste from the outlet adapter 22 of the preceding leaching cylinder 36 or the preceding first leaching cylinder 12.

Figure 1:
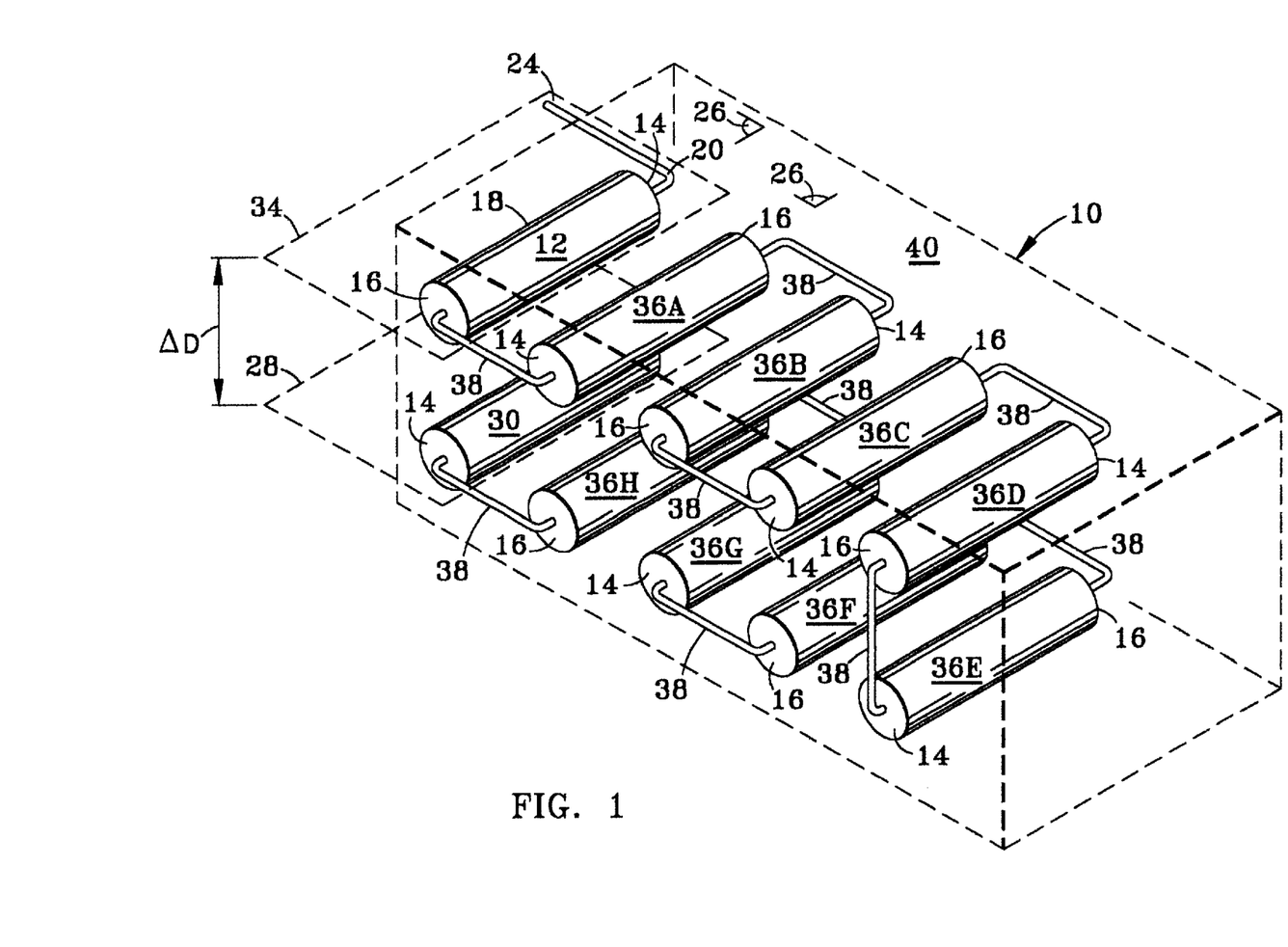
FIG. 1 is a schematic representation of a right side top perspective view of the serially configured multi-level leaching system.
Figure 2:
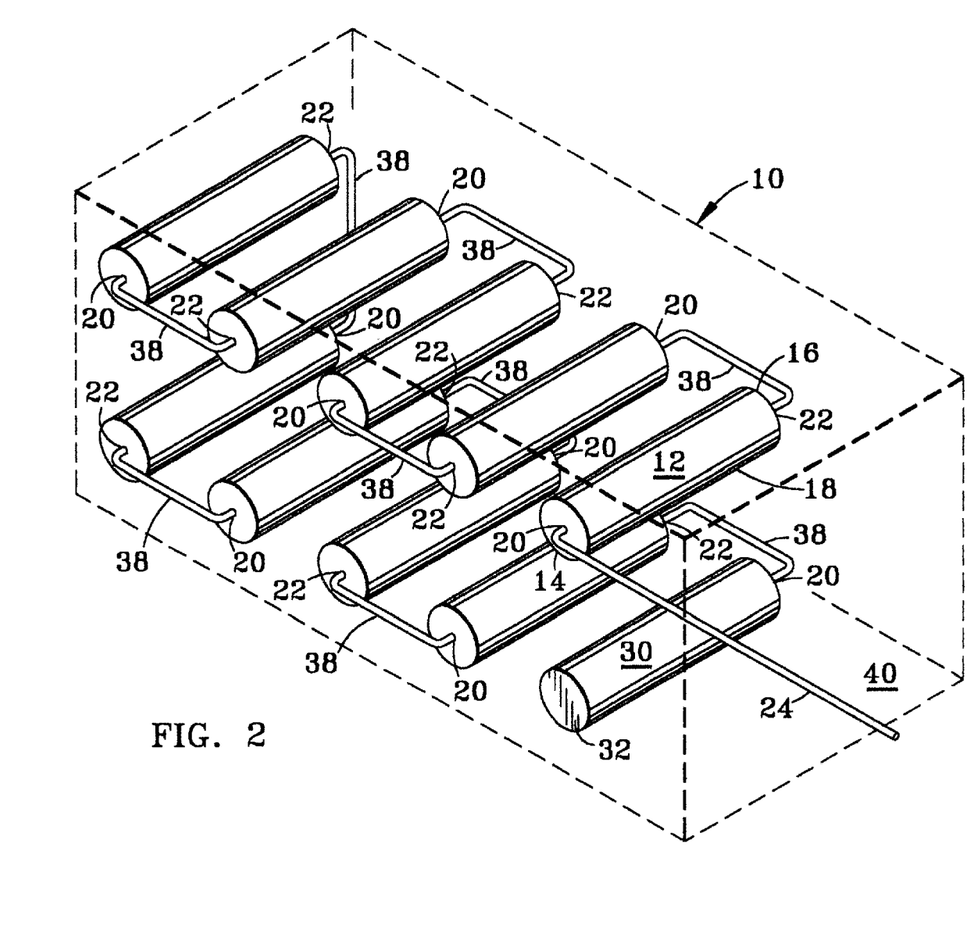
FIG. 2 is a schematic representation of a perspective view taken from the top rear left side of the serially configured multi-level leaching system of FIG. 1.
Figure 3:
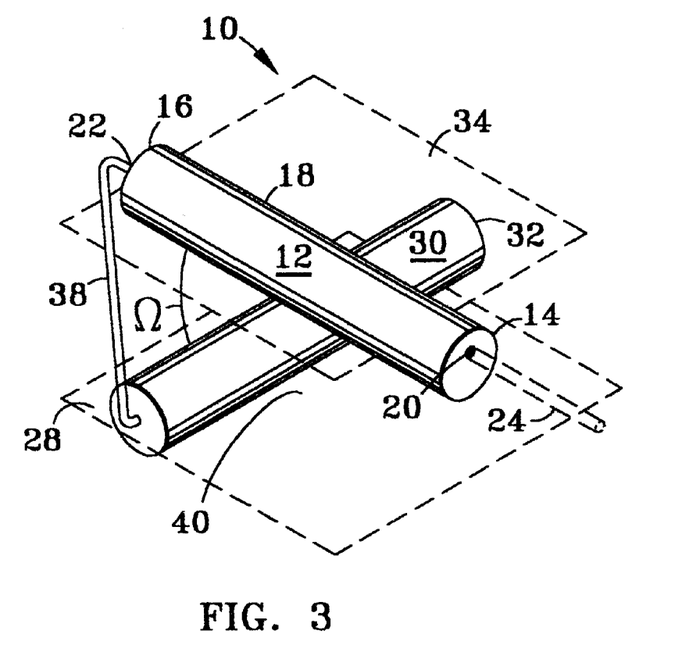
FIG. 3 is a schematic representation of a right side top perspective view of a most fundamental serially configured multi-level leaching system with two leaching cylinder one cylinder substantially orthogonal to the second and one of the cylinders being at a depth different than the second.
Figure 4:
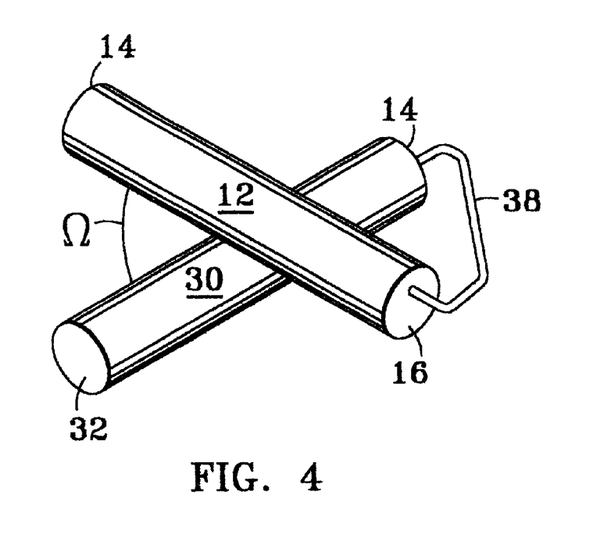
FIG. 4 is a schematic representation of a perspective view taken from the top rear left side of the multi-level leaching system of FIG. 3.

The system 10 may further contain intermediate leaching cylinders 36. The intermediate leaching cylinders 36 are each composed of first and second end walls 14, 16 connected by liquid permeable lateral wall 18. The first and second end walls 14, 16 contain inlet and outlet adapters 20, 22, respectively. The inlet adapter 20 is configured to receive liquid waste from the outlet adapter 22 of the preceding leaching cylinder 36 or the preceding first leaching cylinder 12. The outlet adapter 22 is configured to transmit liquid waste to the inlet adapter 20 of the subsequent intermediate leaching cylinder 36 or the subsequent final leaching cylinder 30.

The configuration of the system 10 includes a means for connection 38 to transmit liquid waste from the inlet adapter 20 of the preceding leaching cylinder 12, 36 to the outlet adapter 22 of the subsequent leaching cylinder 30, 36. The connection means 38 may be a solid pipe. The solid pipe may be composed of a plastic material, such as PVC, a metal, another suitable material or a combination of substances.

The configuration of the system 10 includes a means for dispersing liquid 40. The dispersing means 40 includes, but is not limited to, one or more of the following materials: sand, gravel, plastic fibers, wood products, slag and ash. The dispersing means 40 is placed adjacent the leaching cylinders 12, 30, 36 to a given distance. The given distance can be about 6 inches to facilitate capillary action away from the cylinder 12, 30, 36 but not into another cylinder 12, 30, 36.

In the present embodiment, leaching cylinders 36 A–H are shown in FIGS. 1 and 2 and may be collectively referred to as intermediate leaching conduit or cylinders 36. Waste liquid introduced into system 10 flows through the liquid waste source pipe 24 and into the first leaching cylinder 12 through the inlet adapter 20 located in the first end wall 14 of the cylinder 12. A portion of the waste liquid is contained within the first leaching cylinder 12 and begins to permeate through the liquid permeable lateral wall 18 of the first leaching cylinder 12. The remainder of the waste liquid flows out of the outlet adapter 22 of the second end wall 16 of the first leaching cylinder 12.

The waste liquid continues to flow from the outlet adapter 22 of first leaching cylinder 12 through the pipe connecting means 38 into the inlet adapter 20 of the intermediate leaching cylinder 36A. A portion of the waste liquid is contained within the intermediate leaching cylinder 36A and begins to permeate through the liquid permeable lateral wall 18 of the intermediate leaching cylinder 36A. The remainder of the waste liquid flows out of the outlet adapter 22 of the second end wall 16 of the intermediate leaching cylinder 36A.

The waste liquid continues to flow out from the outlet adapter 22 of the intermediate leaching cylinder 36A through the pipe connecting means 38 into the inlet adapter 20 of the intermediate leaching cylinder 36B. A portion of the waste liquid is contained within the intermediate leaching cylinder 36B and begins to permeate through the liquid permeable lateral wall 18 of the intermediate leaching cylinder 36B. The remainder of the waste liquid flows out of the outlet adapter 22 of the second end wall 16 of the intermediate leaching cylinder 36B.

The waste liquid continues to flow out from the outlet adapter 22 of the intermediate leaching cylinder 36B through the pipe connecting means 38 into the inlet adapter 20 of the intermediate leaching cylinder 36C. A portion of the waste liquid is contained within the intermediate leaching cylinder 36C and begins to permeate through the liquid permeable lateral wall 18 of the intermediate leaching cylinder 36C. The remainder of the waste liquid flows out of the outlet adapter 22 of the second end wall 16 of the intermediate leaching cylinder 36C.

The waste liquid continues to flow out from the outlet adapter 22 of the intermediate leaching cylinder 36C through the pipe connecting means 38 into the inlet adapter 20 of the intermediate leaching cylinder 36D. A portion of the waste liquid is contained within the intermediate leaching cylinder 36D and begins to permeate through the liquid permeable lateral wall 18 of the intermediate leaching cylinder 36D. The remainder of the waste liquid flows out of the outlet adapter 22 of the second end wall 16 of the intermediate leaching cylinder 36D.

The waste liquid continues to flow out from the outlet adapter 22 of the intermediate leaching cylinder 36D through the pipe connecting means 38 into the inlet adapter 20 of the intermediate leaching cylinder 36E. A portion of the waste liquid is contained within the intermediate leaching cylinder 36E and begins to permeate through the liquid permeable lateral wall 18 of the intermediate leaching cylinder 36E. The remainder of the waste liquid flows out of the outlet adapter 22 of the second end wall 16 of the intermediate leaching cylinder 36E.

The waste liquid continues to flow out from the outlet adapter 22 of the intermediate leaching cylinder 36E through the pipe connecting means 38 into the inlet adapter 20 of the intermediate leaching cylinder 36F. A portion of the waste liquid is contained within the intermediate leaching cylinder 36E and begins to permeate through the liquid permeable lateral wall 18 of the intermediate leaching cylinder 36F. The remainder of the waste liquid flows out of the outlet adapter 22 of the second end wall 16 of the intermediate leaching cylinder 36F.

The waste liquid continues to flow out from the outlet adapter 22 of the intermediate leaching cylinder 36F through the pipe connecting means 38 into the inlet adapter 20 of the intermediate leaching cylinder 36G. A portion of the waste liquid is contained within the intermediate leaching cylinder 36G and begins to permeate through the liquid permeable lateral wall 18 of the intermediate leaching cylinder 36G. The remainder of the waste liquid flows out of the outlet adapter 22 of the second end wall 16 of the intermediate leaching cylinder 36G.

The waste liquid continues to flow out from the outlet adapter 22 of the intermediate leaching cylinder 36G through the pipe connecting means 38 into the inlet adapter 20 of the intermediate leaching cylinder 36H. A portion of the waste liquid is contained within the intermediate leaching cylinder 36G and begins to permeate through the liquid permeable lateral wall 18 of the intermediate leaching cylinder 36H. The remainder of the waste liquid flows out of the outlet adapter 22 of the second end wall 16 of the intermediate leaching cylinder 36H.

The waste liquid continues to flow out from the outlet adapter 22 of the intermediate leaching cylinder 36H through the pipe connecting means 38 into the inlet adapter 20 of the final leaching cylinder 30. The waste liquid is contained within the final leaching cylinder 30 by the end cap 32 of the second end wall 16 of the final leaching cylinder 30 and the waste liquid permeates through the liquid permeable lateral wall 18 of the final leaching cylinder 30.

The component cylinders 12, 30, 36 of system 10 are arranged such that the first cylinder 12 is within the uppermost horizontal plane 28 and the final leaching cylinder 30 is within the lowermost horizontal plane 34. The lowermost plane 34 must be a given distance below the uppermost plane 28 to permit a minimum amount of dispersing material 40 to be placed between the planes 28, 34. The uppermost and lowermost horizontal planes 28, 34 may contain one or more intermediate leaching cylinders 36, respectively. The region between the uppermost and lowermost horizontal planes 28, 34 may contain one or more intermediate leaching cylinders 36. Alternatively, the region between the two cylinders may contain no intermediate leaching cylinders 36.

The arrangement of the component cylinders in the preferred embodiment is such that the first leaching cylinder 12 is oriented toward the waste liquid source pipe 26. Subsequent intermediate cylinders in the uppermost horizontal plane 28 are oriented in parallel, alternating directions to facilitate serial connectivity with short pipes 38. The lowermost horizontal plane 34 is similar to the arrangement of the uppermost horizontal plane 28 with a vertical pipe 38 connecting the intermediate cylinders 36 together. The cylinders 12, 30, 36 do not have to be oriented in parallel, alternating directions to one another. Cylinders 12, 30, 36 may be configured such that a triangular, rectangular, square or any shape is formed. Cylinders 12, 30, 36 may also be configured perpendicular to one another in descending levels in a grid-like fashion.

Figure 5:
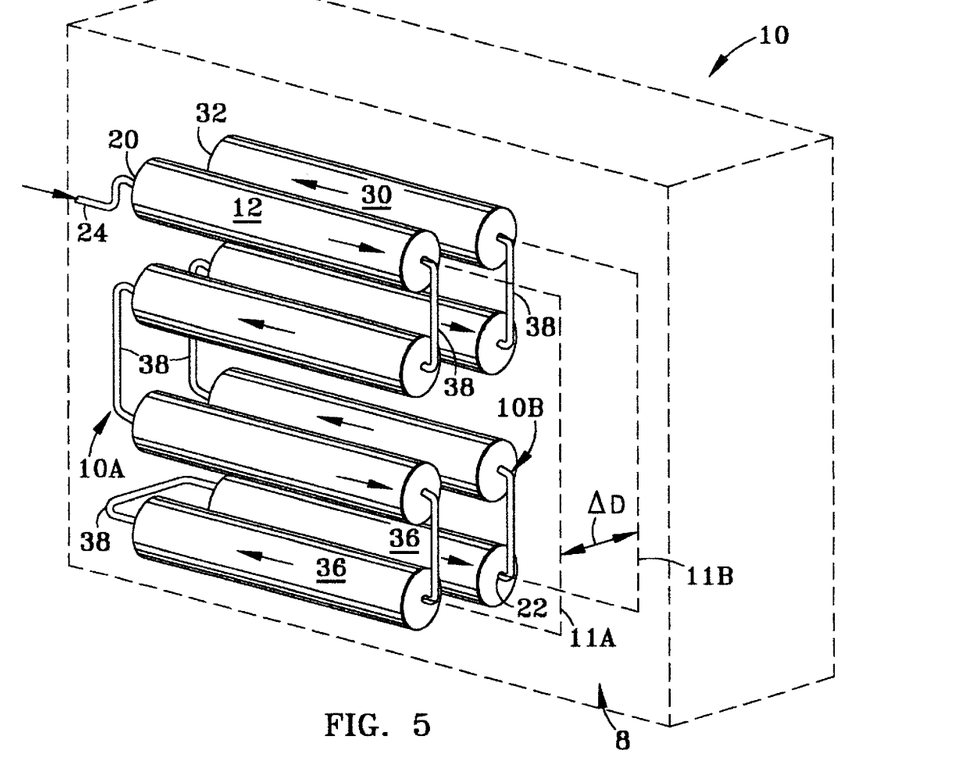
FIG. 5 is a schematic representation of a top, right rear perspective view of the serially configured multi-level leaching system within a leach field showing the difference in depth ΔD between one subsystem and another subsystem.

FIG. 5 is a schematic representation of a top, right rear perspective view of the serially configured multi-level leaching system 10 within a leach field 8 showing the difference in depth ΔD between one subsystem 10A and another subsystem 10B.

Figure 6:
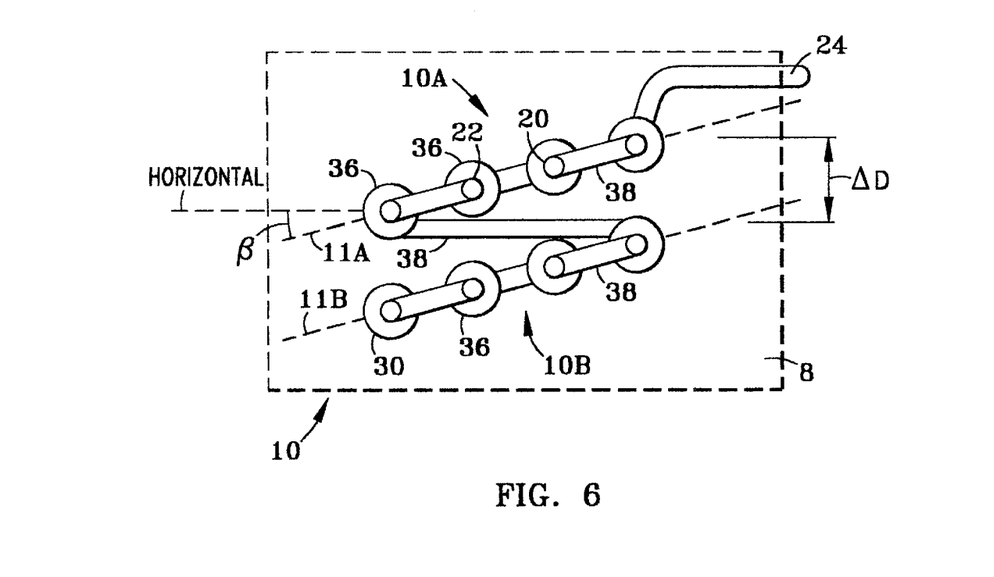
FIG. 6 is a schematic representation of a side plan view of the serially configured multi-level leaching system within a leach field showing the difference in depth ΔD between one subsystem and another subsystem and the angle of the planes of the subsystems to the horizontal.

FIG. 6 is a schematic representation of a side plan view of the serially configured multi-level leaching system 10 within a leach field 8 showing the difference in depth ΔD between one subsystem 10A and another subsystem 10B and the angle 13 of the planes 11A and 11B of the subsystems 10A and 10B respectively to the horizontal.

While not illustrated in a drawing figure, to provide for further processing of the fluid, (either processing of a contaminated fluid from outside the conduit by drawing fluid into the inside of the conduit which fluid now inside the conduit is more free of contaminant or providing for the transmission of fluid from within the conduit and into the material within which the multi-level system is installed) a single layer or a multilayer fabric of varying deniers, may be wrapped around the outer surface of the liquid permeable wall of at least some of cylinders, first or input conduit 12, last or final conduit 30, or any of the intermediate conduits 36 for the processing and treatment of fluids which must be treated to remove materials so that the resultant treated fluid may be reused and/or returned to the earth and particularly to the water table. Each layer, where there are multiple layers, may be of selected denier, and in combination with conduit around which it is wrapped, either smooth-walled or corrugated, when placed in a drainage field 8 or used with leaching system 10 provides a large surface area whereon consequent biodegradation of said oils, greases and chemicals takes place permitting treated fluid to pass omnidirectionally through the assemblage of fibers and subsequently leach into the ground. Additionally, the fabric layers may be pretreated with chemicals, bacteria, and/or microbes such as known oil digesting microbes in order to particularize the use of leaching system 10 in the processing or treating of fluids.

Other embodiments of system 10 may also contain one or more distribution boxes that permit more than one serial path. The distribution box may be located at one or more of the following places including the liquid waste source pipe 24, the first leaching cylinder 12, any of the intermediate leaching cylinders 36, before the final leaching cylinder 30, and the connecting pipe 38.

It is clear that the present invention, a multi-level leaching system having a plurality of preferably planar subsystems each subsystem at different depths within a leaching field for the processing and treatment of fluids and many of its attendant advantages is understood from the foregoing description and it will be apparent that various changes may be made in the form, construction and arrangement of the parts thereof without departing from the spirit and scope of the invention or sacrificing all of its material advantages, the form hereinbefore described being merely a preferred or exemplary embodiment thereof.

What is claimed is:

1. A multi-level leaching system comprising:
   a leaching field;
   at least two leaching subsystems wherein each of said at least two leaching subsystems is located at a different depth, one directly below the other, within said leaching field having said leaching system installed therein, each said leaching subsystem comprising:
      at least one liquid permeable conduit each having an input end and an output end,
      means for providing fluid flow connection such that fluid being leached flows into and through said at least one liquid permeable conduit of one of said at least two leaching subsystems and subsequently into and through said at least one liquid permeable conduit of all others of said at least two leaching subsystems.

2. The multi-level leaching system according to claim 1 wherein at least one of said at least two leaching subsystems is substantially planar.

3. The multi-level leaching system according to claim 2 wherein each said at least one liquid permeable conduit is cylindrical.

4. The multi-level leaching system according to claim 3 wherein each said at least one liquid permeable conduit further comprises a fabric of a selectable denier, said fabric being wrapped about a selected number of said liquid permeable conduits, said fabric for further processing and treating of said fluid being leached.

5. The multi-level leaching system according to claim 4 wherein said fabric further comprises treatment with material selected from the group consisting of, chemicals, bacteria, microbes including known oil digesting microbes, said treatment to particularize the use of the said multi-level leaching system.

6. The multi-level leaching system according to claim 5 wherein said liquid permeable conduits of at least one of said at least two leaching subsystems is arranged such that the axial direction of said liquid permeable conduits is substantially horizontally directed and whereby orthogonals to the axial center-lines of said liquid permeable conduit need not be substantially horizontal, said axial center-lines and said orthogonals thereby forming said at least one planar leaching subsystems.

7. The multi-level leaching system according to claim 2 wherein each said at least one liquid permeable conduit further comprises a fabric of a selectable denier, said fabric being wrapped about a selected number of said liquid permeable conduits, said fabric for further processing and treating of the fluid being leached.

8. The multi-level leaching system according to claim 7 wherein said fabric further comprises treatment with material selected from the group consisting of, chemicals, bacteria, microbes including known oil digesting microbes, said treatment to particularize the use of the said multi-level leaching system.

9. The multi-level leaching system according to claim 8 wherein said liquid permeable conduits of at least one of said at least two leaching subsystems is arranged such that the axial direction of said liquid permeable conduits is substantially horizontally directed and whereby orthogonals to the axial center-lines of said liquid permeable conduit need not be substantially horizontal, said axial center-lines and said orthogonals thereby forming said at least one planar leaching subsystems.

10. The multi-level leaching system according to claim 7 wherein said liquid permeable conduits of at least one of said at least two leaching subsystems is arranged such that the axial direction of said liquid permeable conduits is substantially horizontally directed and whereby orthogonals to the axial center-lines of said liquid permeable conduit need not be substantially horizontal, said axial center-lines and said orthogonals thereby forming said at least one planar leaching subsystems.

11. The multi-level leaching system according to claim 2 wherein said liquid permeable conduits of at least one of said at least two leaching subsystems is arranged such that the axial direction of said liquid permeable conduits is substantially horizontally directed and whereby orthogonals to the axial center-lines of said liquid permeable conduit need not be substantially horizontal, said axial center-lines and said orthogonals thereby forming said at least one planar leaching subsystems.

12. The multi-level leaching system according to claim 3 wherein said liquid permeable conduits of at least one of said at least two leaching subsystems is arranged such that the axial direction of said liquid permeable conduits is substantially horizontally directed and whereby orthogonals to the axial center-lines of said liquid permeable conduit need not be substantially horizontal, said axial center-lines and said orthogonals thereby forming said at least one planar leaching subsystems.

13. The multi-level leaching system according to claim 4 wherein said liquid permeable conduits of at least one of said at least two leaching subsystems is arranged such that the axial direction of said liquid permeable conduits is substantially horizontally directed and whereby orthogonals to the axial center-lines of said liquid permeable conduit need not be substantially horizontal, said axial center-lines and said orthogonals thereby forming said at least one planar leaching subsystems.

14. The multi-level leaching system according to claim 1 wherein each said at least one liquid permeable conduit is cylindrical.

15. The multi-level leaching system according to claim 14 wherein each said at least one liquid permeable conduit further comprises a fabric of a selectable denier, said fabric being wrapped about a selected number of said liquid permeable conduits, said fabric for further processing and treating of said fluid being leached.

16. The multi-level leaching system according to claim 15 wherein said fabric further comprises treatment with material selected from the group consisting of, chemicals, bacteria, microbes including known oil digesting microbes, said treatment to particularize the use of the said multi-level leaching system.

17. The multi-level leaching system according to claim 1 wherein each said at least one liquid permeable conduit further comprises a fabric of a selectable denier, said fabric being wrapped about a selected number of said liquid permeable conduits, said fabric for further processing and treating of the fluid being leached.

18. The multi-level leaching system according to claim 17 wherein said fabric further comprises treatment with material selected from the group consisting of, chemicals, bacteria, microbes including known oil digesting microbes, said treatment to particularize the use of the said multi-level leaching system.

19. A multi-level leaching system comprising:
   a leaching field;
   two leaching subsystems wherein one of said two leaching subsystems is located directly vertically at a lesser depth than the other of said two leaching subsystems within said leaching field having said leaching system installed therein, each said two leaching subsystems comprising:
      a plurality of liquid permeable cylindrical conduits each having an input end and an output end, each said liquid permeable cylindrical conduit further comprises a fabric of a selectable denier, said fabric being wrapped about a selected number of said liquid permeable cylindrical conduits, wherein said fabric further comprises treatment with material selected from the group consisting of, chemicals, bacteria, microbes including known oil digesting microbes, said treatment to particularize the use of the multi-level leaching system for further processing and treating of said fluid being leached,
      means for providing fluid flow connection such that fluid being leached flows into and through each said liquid permeable conduit of said one leaching subsystem and subsequently into and through each said liquid permeable conduit of said other leaching subsystem.

20. A multi-level leaching system, said multi-level leaching system comprising:
   a first leaching cylinder, having an axially directed center-line therethrough, said first leaching cylinder having first and second opposed end walls connected by a liquid permeable lateral wall, said first and second end walls of said first leaching cylinder having an inlet adapter and an outlet adapter, respectively, said inlet adapter attached adjacent to a liquid waste source pipe, said first leaching cylinder substantially horizontally oriented defining thereby a substantially horizontal uppermost plane;
   a final leaching cylinder, having an axially directed center-line therethrough, said final leaching cylinder having first and second opposed end walls connected by a liquid permeable lateral wall, said first and second end walls having an inlet adapter and an end cap, respectively, said final leaching cylinder substantially horizontally oriented and configured below said uppermost plane defining a substantially horizontal lowermost plane, said final leaching cylinder center-line forming an uppermost to lowermost cylinder angle $\Omega$ with said first leaching cylinder center-line of between 0° and 90°;
   a means for connecting said outlet adapter of said first leaching cylinder to said inlet adapter of said final leaching cylinder, said connecting means having first and second openings, said first opening adjacently connected to said outlet adapter of said first leaching cylinder and said second opening adjacently connected to said inlet adapter of said final leaching cylinder; and
   means for dispersing liquid away from said first leaching cylinder and said final leaching cylinder, said dispersing means located adjacently to said cylinders.

21. A multi-level leaching system, said multi-level leaching system comprising:
   a first leaching cylinder, said first leaching cylinder having first and second opposed end walls connected by a liquid permeable lateral wall, said first and second end walls of said first leaching cylinder having an inlet adapter and an outlet adapter, respectively, said inlet adapter attached adjacent to a liquid waste source pipe, said first leaching cylinder horizontally oriented at a first given angle with respect to the liquid waste source pipe and defining a substantially horizontal uppermost plane;
   a final leaching cylinder, said final leaching cylinder having first and second opposed end walls connected by a liquid permeable lateral wall, said first and second end walls having an inlet adapter and an end cap, respectively, said final leaching cylinder horizontally oriented at a second given angle with respect to the liquid waste source pipe and configured below said uppermost plane defining a substantially horizontal lowermost plane;
   at least one intermediate leaching cylinder, each said at least one intermediate leaching cylinder having first and second opposed end walls connected by a liquid permeable lateral wall, said first and second end walls having an inlet adapter and an outlet adapter, respectively, each said at least on intermediate leaching cylinder independently oriented with respect to said liquid waste source pipe and configured vertically within the inclusive range of said uppermost plane to said lowermost plane, respectively, said at least one intermediate leaching cylinder having a first inlet adapter and a final outlet adapter, said first inlet adapter of said at least one intermediate leaching cylinder adjacently connected to said outlet adapter of said first leaching cylinder, said final outlet adapter of said at least one intermediate leaching cylinder adjacently connected to said inlet adapter of said final leaching cylinder, said at least one intermediate leaching cylinder having a first outlet adapter and a final inlet adapter, said at least one intermediate leaching cylinder sequentially connected adjacently together from said first outlet adapter to said final inlet adapter with said outlet adapter of the preceding cylinder adjacently connected to said inlet adapter of the following cylinder;

means for connecting each said at least one intermediate leaching cylinder sequentially together, each said means for connecting having first and second openings, said first opening adjacently connected to said outlet adapter of the preceding cylinder and said second opening adjacently connected to said inlet adapter of the following cylinder of said at least one intermediate leaching cylinder, respectively;

means for connecting said outlet adapter of said first leaching cylinder to said first inlet adapter of said at least one intermediate leaching cylinder, said means for connecting having first and second openings, said first opening adjacently connected to said outlet adapter of said first leaching cylinder and said second opening adjacently connected to said first inlet adapter of said at least one intermediate leaching cylinder;

means for connecting said final outlet adapter of said at least one intermediate leaching cylinder to said inlet adapter of said final leaching cylinder, said connecting means having first and second openings, said first opening adjacently connected to said final outlet adapter of said at least one intermediate leaching cylinder, said second opening adjacently connected to said inlet adapter of said final leaching cylinder; and means for dispersing liquid away from said first leaching cylinder, said at least one intermediate leaching cylinder, and said final leaching cylinder, said dispersing means located adjacently to said cylinders.

* * * * *